(12) United States Patent
Stone et al.

(10) Patent No.: US 11,005,939 B2
(45) Date of Patent: *May 11, 2021

(54) SMART AVIATION DYNAMIC COOKIE

(71) Applicant: SMARTSKY NETWORKS LLC, Morrisville, NC (US)

(72) Inventors: Ryan M. Stone, Charlotte, NC (US); Blane E. Rockafellow, Raleigh, NC (US); Elbert Stanford Eskridge, Jr., Chapel Hill, NC (US)

(73) Assignee: SMARTSKY NETWORKS LLC, Morrisville, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/906,244

(22) Filed: Jun. 19, 2020

(65) Prior Publication Data
US 2020/0322436 A1 Oct. 8, 2020

Related U.S. Application Data

(63) Continuation of application No. 15/568,560, filed as application No. PCT/US2016/023358 on Mar. 21, 2016, now Pat. No. 10,728,337, which is a continuation of application No. 14/700,734, filed on Apr. 30, 2015, now Pat. No. 9,325,793.

(51) Int. Cl.
*G06F 15/16* (2006.01)
*H04L 29/08* (2006.01)
*G08G 5/00* (2006.01)

(52) U.S. Cl.
CPC .......... *H04L 67/12* (2013.01); *G08G 5/0013* (2013.01); *G08G 5/0021* (2013.01); *H04L 67/02* (2013.01); *H04L 67/142* (2013.01); *H04L 67/18* (2013.01)

(58) Field of Classification Search
CPC ....... H04L 67/12; G08F 5/0013; G08F 5/0021
USPC .................................................. 709/203, 219
See application file for complete search history.

(56) References Cited

U.S. PATENT DOCUMENTS

| 6,757,712 B1 * | 6/2004 | Bastian .............. B64D 11/0015 709/203 |
| 6,810,527 B1 | 10/2004 | Conrad et al. |
| 9,318,024 B1 * | 4/2016 | Natwick ................. H04W 4/42 |

(Continued)

OTHER PUBLICATIONS

International Search Report and Written Opinion of International Application No. PCT/US2016/023358 dated Jun. 7, 2016, all enclosed pages cited.

(Continued)

*Primary Examiner* — Duyen M Doan
(74) *Attorney, Agent, or Firm* — Burr & Forman LLP

(57) ABSTRACT

An information manager may include processing circuitry configured to receive dynamic aircraft information associated with operation of an in-flight aircraft, receive a message from a communication device on the in-flight aircraft for transmission to a ground based content server via a wireless communication network capable of communicating with in-flight assets, and generate an aviation cookie for communication to the content server along with the message. The aviation cookie may be generated based on the dynamic aircraft information and may enable the content server to generate content based at least in part on the dynamic aircraft information.

20 Claims, 4 Drawing Sheets

(56) References Cited

U.S. PATENT DOCUMENTS

| | | | |
|---|---|---|---|
| 2002/0133540 A1* | 9/2002 | Sears, Jr. | ............ G06F 16/9535 |
| | | | 709/203 |
| 2006/0173968 A1 | 8/2006 | Vaarala et al. | |
| 2006/0224752 A1* | 10/2006 | Parekh | ................ H04L 61/1511 |
| | | | 709/230 |
| 2009/0041041 A1 | 2/2009 | True et al. | |
| 2012/0232782 A1 | 9/2012 | Sterkel et al. | |
| 2014/0136589 A1 | 5/2014 | Wahler et al. | |
| 2014/0214466 A1* | 7/2014 | Francis | .................. G06Q 50/30 |
| | | | 705/7.13 |

OTHER PUBLICATIONS

Examination report from corresponding Australian application No. 2016254862 dated Oct. 30, 2017, all enclosed pages cited.
Examination report from corresponding Australian application No. 2018201355 dated May 31, 2019, all enclosed pages cited in its entirety.

* cited by examiner

SMART AVIATION DYNAMIC COOKIE

CROSS REFERENCE TO RELATED APPLICATION

This application is a continuation of U.S. application Ser. No. 15/568,560 filed on Oct. 23, 2017 which is the U.S. National Phase application of international application number PCT/US2016/023358 filed on Mar. 21, 2016 which claims priority to U.S. application Ser. No. 14/700,734 filed Apr. 30, 2015, the entire contents of which are incorporated herein by reference.

TECHNICAL FIELD

Example embodiments generally relate to wireless communications and, more particularly, relate to the use of aircraft position information in relation to serving content to users of a wireless communication network capable of communicating with in-flight assets.

BACKGROUND

High speed data communications and the devices that enable such communications have become ubiquitous in modern society. These devices make many users capable of maintaining nearly continuous connectivity to the Internet and other communication networks. Although these high speed data connections are available through telephone lines, cable modems or other such devices that have a physical wired connection, wireless connections have revolutionized our ability to stay connected without sacrificing mobility.

However, in spite of the familiarity that people have with remaining continuously connected to networks while on the ground, people generally understand that easy and/or cheap connectivity will tend to stop once an aircraft is boarded. Aviation platforms have still not become easily and cheaply connected to communication networks, at least for the passengers onboard. Attempts to stay connected in the air are typically costly and have bandwidth limitations or high latency problems. Moreover, passengers willing to deal with the expense and issues presented by aircraft communication capabilities are often limited to very specific communication modes that are supported by the rigid communication architecture provided on the aircraft.

Conventional ground based communication systems have been developed and matured over the past couple of decades. While advances continue to be made in relation to ground based communication, and one might expect that some of those advances may also be applicable to communication with aviation platforms, in-flight communication systems actually introduce a number of unique challenges and opportunities that will necessitate or otherwise influence various changes in network operation relative to conventional ground based communication.

BRIEF SUMMARY OF SOME EXAMPLES

One additional factor to consider relative to in-flight communication is that the coverage ranges that may be possible to achieve in in-flight networks can be vastly larger than the ranges possible for ground based networks. Additionally, the mobile devices being served in an in-flight context are moving at much higher speeds, and over much longer distances, than a typical ground-based wireless customer. Based on this rapid movement, potentially large geographic displacement, and unique travel context that may be shared by multiple users, some interesting opportunities may exist in relation to content provision to the users based on location information associated with the aircraft, especially when coupled with information unique to each user or connection node (machine or humans individually or together can constitute a 'user') on the aircraft. Example embodiments may therefore insert aircraft location information (and/or other information related to the aircraft and/or information related to the user) into requests originating from users on an aircraft being served in a wireless communication network capable of communicating with in-flight assets (such as an air-to-ground (ATG) network).

In one example embodiment, an information manager is provided. The information manager may include processing circuitry configured to receive dynamic aircraft information associated with operation of an in-flight aircraft, receive a message from a communication device on the in-flight aircraft for transmission to a ground based content server via a wireless communication network capable of communicating with in-flight assets, and generate an aviation cookie for communication to the content server along with the message. The aviation cookie may be generated based on the dynamic aircraft information and may enable the content server to generate content based at least in part on the dynamic aircraft information.

In another example embodiment, a wireless communication network capable of communicating with in-flight assets is provided. The network may include a plurality of access points and at least one aircraft having mobile communications nodes thereon. The network may also include an information manager on the aircraft, or at least operably coupled to the network. The information manager may include processing circuitry configured to receive dynamic aircraft information associated with operation of an in-flight aircraft, receive a message from a communication device on the in-flight aircraft for transmission to a ground based content server via a wireless communication network capable of communicating with in-flight assets, and generate an aviation cookie for communication to the content server along with the message. The aviation cookie may be generated based on the dynamic aircraft information and may enable the content server to generate content based at least in part on the dynamic aircraft information.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
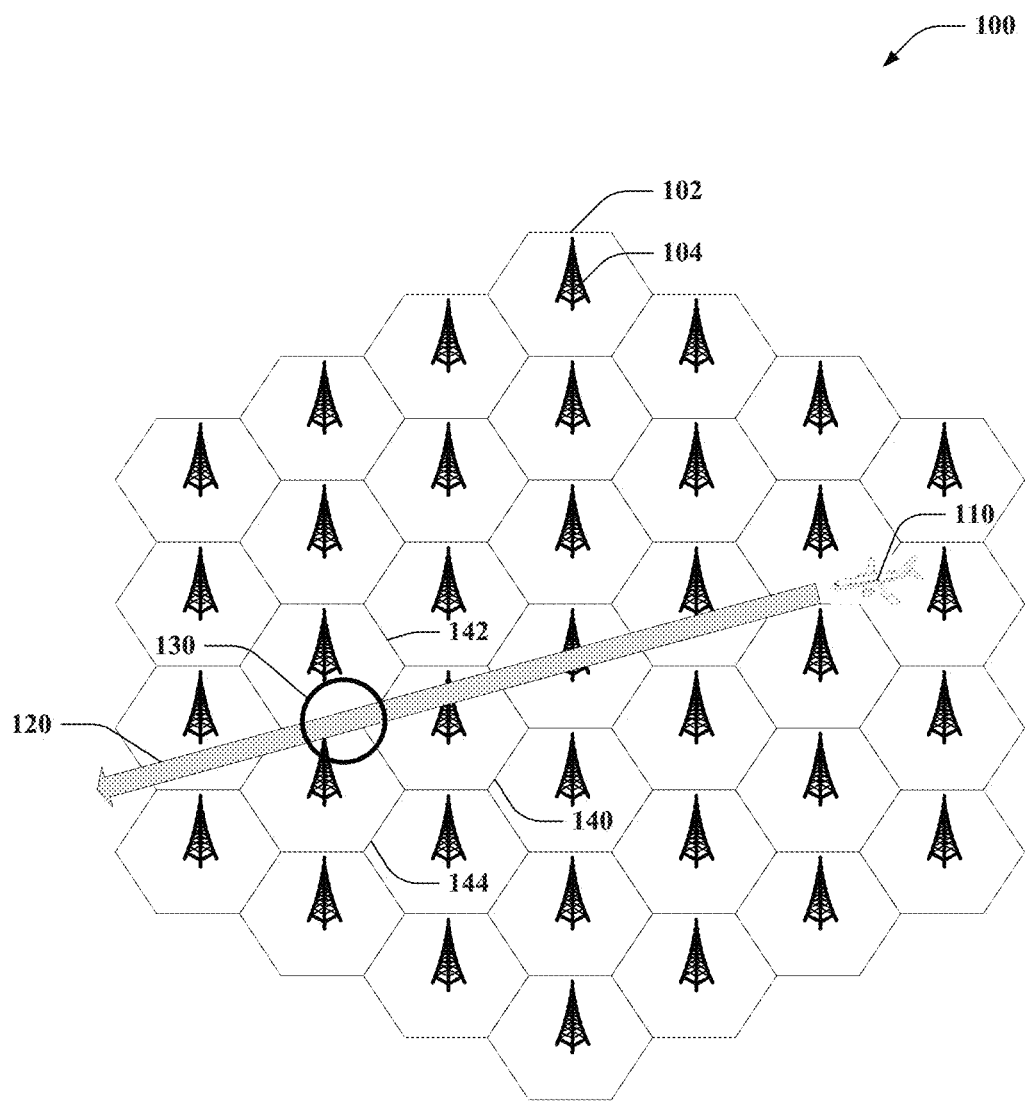
FIG. 1 illustrates an aircraft moving through the coverage areas of different access points over time in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, the terms "data," "content," "information" and similar terms may be used interchangeably to refer to data capable of being transmitted, received and/or stored in accordance with example embodiments. Thus, use of any such terms should not be taken to limit the spirit and scope of example embodiments.

As used in herein, the terms "component," "module," "system," "device" and the like are intended to include a computer-related entity, such as but not limited to hardware, firmware, a combination of hardware and software, or software in execution on some sort of hardware. For example, a component may be, but is not limited to being, a process running on a processor, a processor, an object, an executable, a thread of execution, a program, and/or a computer. By way of example, both an application running on a computing device and/or the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Artificial intelligence based systems (e.g., explicitly and/or implicitly trained classifiers) can be employed in connection with performing inference and/or probabilistic determinations and/or statistical-based determinations in accordance with one or more aspects of the subject matter as described hereinafter. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for generating higher-level events from a set of events and/or data. Such inference results in the construction of new events or actions from a set of observed events or stored event data, regardless of whether the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines, etc.), for example, can be employed in connection with performing automatic and/or inferred actions in connection with the subject matter.

Thus, for example, some embodiments may provide a network device or system in which a component is provided to use internally or externally derived position information associated with mobile communication nodes within the network (i.e., an aircraft or the communication devices thereon) in order to make inferences and/or probabilistic determinations about where and when such nodes will be most advantageously served by various ones of the base stations of the network. Control signals and functionalities may therefore be generated for control of the base stations and/or for instruction to the communication nodes in order to facilitate efficient operation of the network. Load balancing, antenna beam steering, interference mitigation, network security and/or denial of service functions may therefore be enhanced by the operation of some embodiments.

Cookies are well known in the area of web browsing, and are used in a number of ways within that context. Cookies are often provided to enable content providers (e.g., websites) to retain stateful information about users or track the activity of the users, often in an attempt to target content to users or make the browsing experience more enjoyable. Traditional cookies often involve the sending of data (i.e., the cookie) from a website that is visited by a user to the user's web browser while the user is visiting the website. When the user returns to the website, the browser sends the cookie back to the server associated with the website. By tracking user activity with cookies, targeted advertisements or other content that is tailored to the user can be provided.

Although a number of different types of cookies are possible, some users object to the saving of cookies on their devices and attempt to block cookies. Various other mechanisms have therefore been developed to accomplish the same results achievable with a traditional cookie, but do so without storing blockable cookies on the user's device. As such, within the context of this disclosure, although the term "cookie" will be used to describe some example embodiments, it should be appreciated that the example embodiments described herein need not take the form of a traditional cookie. Instead, example embodiments approximate the function of a cookie in some ways, but may be the same or different in form, and are distinguishable in function by the unique application and context involved the employment of these cookies in an in-flight network. Given that current in-flight networks have limited capabilities for providing information about aircraft and/or location due to limited bi-directional bandwidth and other constraints, example embodiments may provide a practical way to cure that deficiency and create "smart" or "intelligent" content leveraging the smart aviation dynamic cookie.

FIG. 1 illustrates an example layout of a wireless network 100 including multiple cells 102 for providing wireless communication services. The cells 102 can be implemented by one or more access points 104 to facilitate supporting wireless communications within a geographical coverage area of a given cell 102. In this regard, the one or more access points 104 can communicate with one or more wireless communication devices (not shown) present within a respective cell 102. The access points 104 can be assets of one or more existing wireless networks, and/or carriers supporting such networks. Each access point 104 has a wired (or wireless) backhaul connection to the one or more existing wireless networks to allow access thereto for the wireless communications devices connected with the access point 104. Moreover, the access points 104 can be provided via cellular towers or other tower structures (as in the depicted example), rooftops or other structures (e.g. building facades, church steeples, billboards, etc. . . . ) having wireless communication infrastructure, mobile vehicles and vessels, and/or the like. Furthermore, in existing wireless networks, it is to be appreciated that some cells 102 may overlap or completely encompass one another, and/or coverage gaps may exist between some cells 102, etc., though FIG. 1 shows a deployment of substantially adjacent cells that are deployed to provide continuous coverage over a relatively large area.

It should be appreciated that although the cells 102 of FIG. 1 are shown having a particular shape (i.e., a hexagonal shape), cells of example networks could have any shape depending on terrain and/or building constraints. Moreover, it should also be appreciated that although the access points 104 of FIG. 1 are shown to be positioned substantially in the center of the cells 102 with coverage being provided substantially 360 degrees around each respective one of the access points 104, this structure is not required in all examples. To the contrary, access points 104 could be at cell edges or at any other position within the cells 102, and the cells 102 could take any suitable shape dictated by the radiation patterns and sector coverage deployments of the antennas and antenna arrays provided at each respective one of the access points 104. It should also be appreciated that although the cells 102 are generally depicted to end their respective coverage areas where the corresponding coverage area of an adjacent cell begins, there will typically be some amount of overlap in coverage areas of adjacent cells 102.

In an example embodiment in which the wireless network 100 is an air-to-ground (ATG) network, the access points 104 may be enabled to establish wireless communication links to aircraft 110 or mobile communication nodes disposed thereon. The aircraft 110 can be expected to move through the network 100 in such a way as to require handover between various ones of the access points 104 in order to maintain continuous and uninterrupted communication between the mobile communication node(s) on the aircraft 110 and the network devices to which the backhaul connections couple the access points 104. The aircraft 110 may be a commercial or business jet or other airplane, or the aircraft 110 could be a drone, satellite, balloon, or other in-flight asset capable of communication with ground based communication equipment forming a network. Given that the cells 102 in an ATG network define three dimensional (3D) coverage areas that extend up to a predetermined altitude, it should therefore also be appreciated that the borders or edges between cells 102 may vary based on altitude. Thus, the borders between cells 102 in FIG. 1 may apply at a particular altitude. However, the borders may be different (or the same) at other altitudes. Thus, unlike a typical terrestrial network, where a change in latitude and longitude coordinates would typically be the driving determiner for which cell 102 the mobile communications nodes of the network select for communication purposes, within the network 100, a handover between cells could be necessitated or desirable merely on the basis of altitude change for a given location in terms of latitude and longitude coordinates.

As shown in FIG. 1, the aircraft 110 may follow a route 120 that causes the aircraft 110 to pass through certain ones of the cells 102. As the aircraft 110 passes through each respective one of the cells 102 along the route 120, the mobile communication node (or nodes) of the aircraft 110 may communicate with the respective 104 access points of the cells 102 along the route 120. However, the communication node (or nodes) of the aircraft 110 may not encounter or ever communicate with a number of the cells 102. In particular, the aircraft 110 may not communicate with cells 102 that are located remotely from the route 120.

Meanwhile, there may also be certain areas along the route 120 at which the aircraft 110 may be in or next two multiple cells 102 at a particular point in time. For example, in overlap region 130, the route 120 carries the aircraft 110 near the intersection of three different cells (e.g., a first cell 140, a second cell 142 and a third cell 144). The route 120 initially has the aircraft 110 completely within the first cell 140. However, the route 120 then carries the aircraft 110 proximate to the second cell 142. In this example, the aircraft 110 may actually spend a short time proximate to edges of the first cell 140, the second cell 142 and the third cell 144 at the same time. Then, the route 120 may provide that the aircraft 110 travels along the edge between the second cell 142 and the third cell 144 for a relatively long period of time.

In some networks, the mobile communication nodes on the aircraft 110 may be configured to request handover based on signal strength changes or the like in order to attempt to maintain continuous and uninterrupted coverage. Alternatively, the access points 104 may communicate with each other and/or the mobile communication nodes to handle handover decisions based on signal strength or other criteria.

In an in-flight communications system, the end-user equipment (e.g., wired and wireless routers, mobile phones, laptop computers, on-board entertainment systems, and/or the like) may be installed or otherwise present on the aircraft 110. The user equipment (UE) and any receiving and/or routing device(s) on the aircraft 110 itself may form mobile communication nodes of the wireless network 100. Accordingly, in-flight communications should be understood to involve communications from a network of ground (i.e., meaning land-based or sea-based, otherwise referred to as terrestrial) based access points to any in-flight asset (e.g., airplanes, drones, balloons, satellites, etc.) However, example embodiments are applicable to other wireless communication networks capable of communicating with in-flight assets beyond just ATG networks. As such, the ATG network applications described herein should be appreciated as being just one example of such a network. Networks employing satellites, other aircraft, drones, and/or the like to serve or communicate with other in-flight assets may also employ aviation cookies as described herein. In an example embodiment, the utilization of position information associated with these mobile communication nodes (along with user information, if desired) may be incorporated into communication via the wireless network 100 to alter, enhance or augment the communications conducted via the wireless network 100. In this regard, for example, data, communications or messages leaving the aircraft 110 may be provided with an aviation cookie (e.g., a smart aviation dynamic cookie) that incorporates such information into the data, communications or messages. Content tailored to or based on the location, destination, and/or point of origination of the user may therefore be provided to the UEs or other devices on the aircraft 110.

Figure 2:
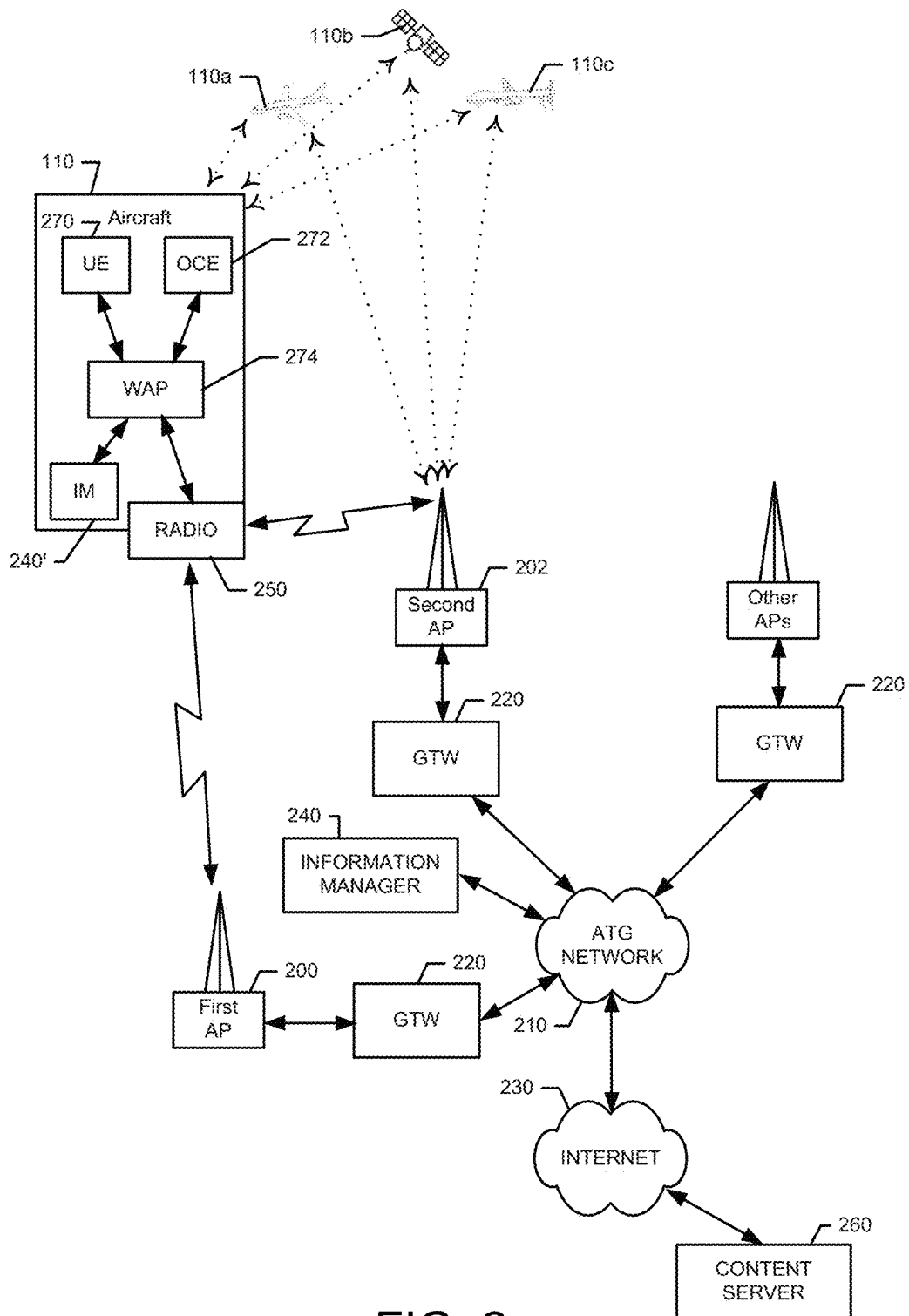
FIG. 2 illustrates a block diagram of a system for employing dynamic aircraft information for generating an aviation cookie in accordance with an example embodiment.

FIG. 2 illustrates a functional block diagram of some components and/or devices of a system facilitating communication in a wireless communication network capable of communicating with in-flight assets that may employ an example embodiment. As shown in FIG. 2, a first access point 200 and a second access point 202 may each be base stations (e.g., examples of access points 104) of an example embodiment of the wireless network 100, which in this case may be an ATG network 210. The ATG network 210 may further include other access points (APs) as well, and each of the APs may be in communication with the ATG network 210 via a gateway (GTW) device 220. The ATG network 210 may further be in communication with a wide area network such as the Internet 230, Virtual Private Networks (VPNs) or other communication networks. In some embodiments, the ATG network 210 may include or otherwise be coupled to a packet-switched core or other telecommunications network. As shown in FIG. 2, the aircraft 110 may be an airplane 110a, a satellite 110b, a drone 110c or any other in-flight asset (e.g., a balloon).

In an example embodiment, the ATG network 210 may include an information manager 240 that may include, for example, processing circuitry configured to handle provision of position information and/or other information related to flight characteristics of the aircraft for communications provided in the ATG network 210 to influence the provision of content to assets on the aircraft 110 or elsewhere. Thus, for example, the information manager 240 may be configured to handle the provision of position information into messages associated with routing voice, video or data (i.e., content) to and from the aircraft 110 (or to mobile communication nodes of or on the aircraft 110) and/or handle other data or communication transfers between the mobile communication nodes of or on the aircraft 110 and the ATG network 210 with respect to position assisted services/content. Alternatively or additionally, the information manager 240 may provide other information about the aircraft 110 or about equipment/sensors on the aircraft 110 for addition into communication transfers between the aircraft 100 and the ATG network 210 with respect to other services/content. In some embodiments, the information manager 240 may be configured for controlling the forwarding of messages and/or data to and from the mobile communication nodes of or on the aircraft 110, and may also control the forwarding of messages for the access points. It should be noted that although the information manager 240 is shown in the system of FIG. 2, the information manager 240 is merely an exemplary network device and example embodiments are not limited to use in a network employing the information manager 240. Moreover, although the information manager 240 is shown as a part of the ATG network 210 that is ground based, it should be appreciated that the information manager 240 could, in some embodiments, be provided on the aircraft 110, at the APs, or at the GTW devices. Moreover, the information manager 240 could be distributed between such entities and/or have duplicated instances at some or all of such entities. FIG. 2 shows an airborne instance of the information manager as IM 240'. When the information manager 240 is provided to support aircraft to aircraft communications in a public or private mesh network environment.

The information manager 240 may be coupled to a data network, such as a local area network (LAN), a metropolitan area network (MAN), and/or a wide area network (WAN) (e.g., the Internet 230) indirectly via the ATG network 210. In turn, devices such as processing elements (e.g., personal computers, laptop computers, smartphones, server computers or the like such as the UEs 270 and OCEs 272) can be coupled to the ATG network 210 via the radio 250 on the aircraft 110. The ATG network 210 may then also couple these devices to the Internet 230. However, by employing an example embodiment, and incorporating aircraft information as described herein, responses provided to the processing elements may be tailored based on the aircraft information, as described herein.

Although not every element of every possible embodiment of the ATG network 210 is shown and described herein, it should be appreciated that the mobile communication nodes of or on the aircraft 110 may be coupled to one or more of any of a number of different public or private networks through the ATG network 210. In this regard, the network(s) can be capable of supporting communication in accordance with any one or more of a number of first-generation (1G), second-generation (2G), third-generation (3G), fourth-generation (4G) and/or future mobile communication protocols or the like. In some cases, the communication supported may employ communication links defined using unlicensed band frequencies such as 2.4 GHz or 5.8 GHz or licensed band frequencies.

As shown in FIG. 2, the aircraft 110 may be capable of accessing content from and/or providing information or requests to the Internet 230 via the ATG network 210. More specifically, the aircraft 110 may include a radio 250 configured to communicate with the APs (e.g., the first AP 200 and the second AP 202) of the ATG network 210. The data, requests, messages and/or the like from the mobile communication devices of or on the aircraft 110 may therefore be communicatively coupled to a content server 260 accessible via the Internet 230. The mobile communication devices of or on the aircraft 110 may include UEs 270 of the passengers and/or crew and other on-board communication equipment (OCE) 272 of the aircraft 110. In some cases, a router of some sort (e.g., a wireless access point (WAP) 274) may be provided on the aircraft 110 to distribute communications received from the ATG network 210 to the UEs 270 and/or OCE 272. In an example embodiment, the communications between the Internet 230 and the UEs 270 or OCE 272 may occur substantially in real time. As such, for example, in some cases there may not be any on-board storage of the content received by the radio 250 prior to distribution of the content to the UEs 270 or OCE 272.

The content server 260 may be any server associated with a website, online service and/or the like. However, in some cases, the content server 260 may be associated with one or more services that store, process or otherwise handle information regarding aircraft information provided for the aircraft 110 via the ATG network 210 while the aircraft 110 is in-flight. The aircraft information may, in many situations, include position information. However, in some cases, the aircraft information may include other flight related data and/or information as described in greater detail below.

Figure 3:
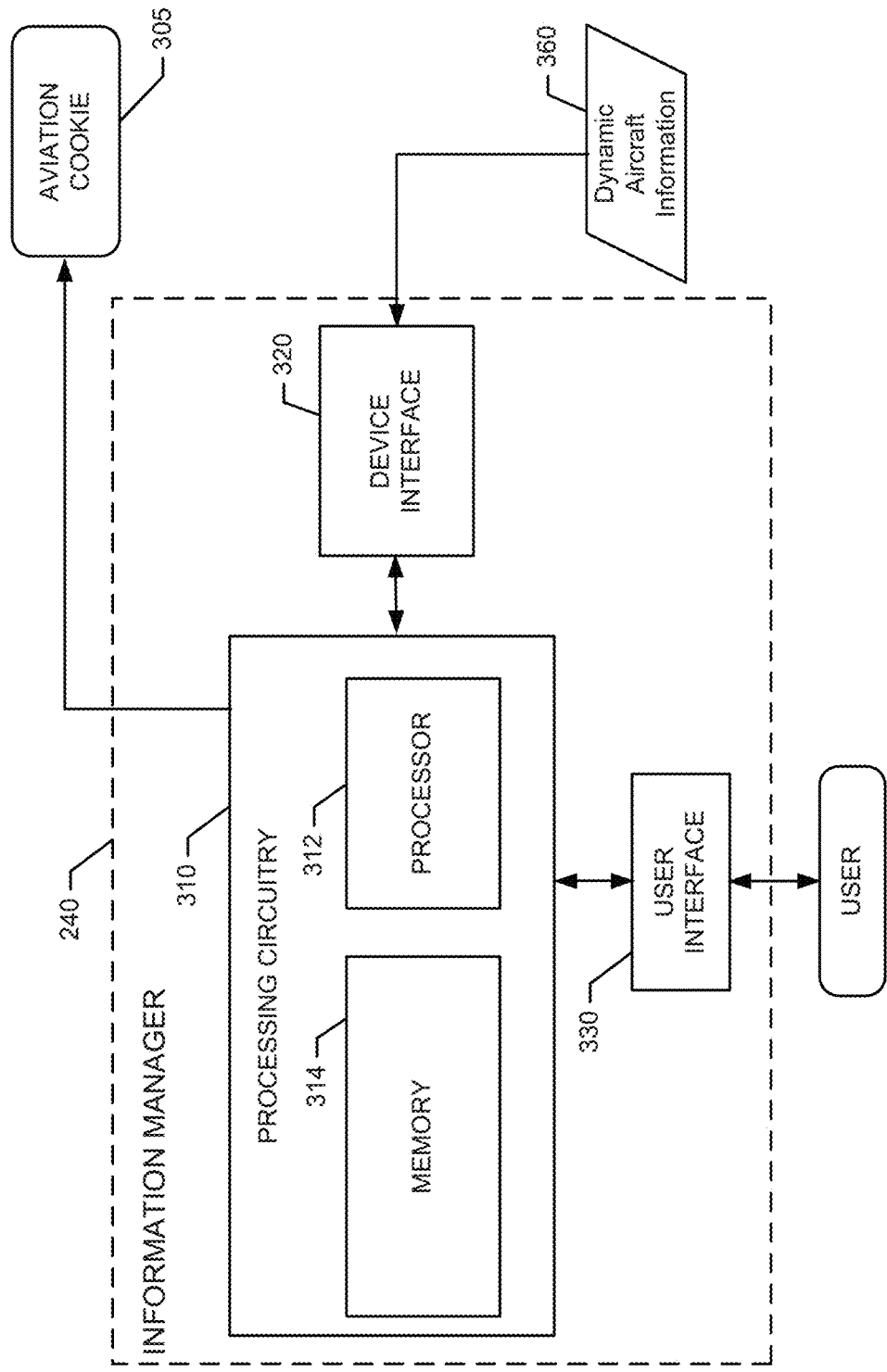
FIG. 3 illustrates control circuitry that may be employed to assist in generating the aviation cookie according to an example embodiment.

FIG. 3 illustrates one possible architecture for implementation of the information manager 240 in accordance with an example embodiment. The information manager 240 may include processing circuitry 310 configured to provide an aviation cookie 305 for network assets based on processing of various input information including dynamic aircraft information associated with the aircraft 110. The processing circuitry 310 may be configured to perform data processing, control function execution and/or other processing and management services according to an example embodiment of the present invention. In some embodiments, the processing circuitry 310 may be embodied as a chip or chip set. In other words, the processing circuitry 310 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 310 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 310 may include one or more instances of a processor 312 and memory 314 that may be in communication with or otherwise control a device interface 320 and, in some cases, a user interface 330. As such, the processing circuitry 310 may be embodied as a circuit chip (e.g., an integrated circuit chip) configured (e.g., with hardware, software or a combination of hardware and software) to perform operations described herein. However, in some embodiments, the processing circuitry 310 may be embodied as a portion of an on-board computer. In some embodiments, the processing circuitry 310 may communicate with various components, entities and/or sensors of the ATG network 210.

The user interface 330 (if implemented) may be in communication with the processing circuitry 310 to receive an indication of a user input at the user interface 330 and/or to provide an audible, visual, mechanical or other output to the user. As such, the user interface 330 may include, for example, a display, one or more levers, switches, indicator lights, touchscreens, proximity devices, buttons or keys (e.g., function buttons), and/or other input/output mechanisms. In some embodiments, crew of the aircraft 110 may interact with the user interface 330 to provide information that may be used to augment or modify dynamic aircraft information 360 that may be received from various sensors of the aircraft 110 or may be generated based on sensor data received from sensors of the aircraft 110. In an example embodiment, the information provided by the user interface 330 may sometimes be manual entry of data otherwise available as the dynamic aircraft information 360. In other words, instead of receiving dynamic aircraft information 360 directly from onboard sensors, some information may be monitored or received by the user and the user may enter such information into the user interface 330.

The device interface 320 may include one or more interface mechanisms for enabling communication with other devices (e.g., modules, entities, sensors and/or other components of the aircraft 110 (or other components of the ATG network 210)). In some cases, the device interface 320 may be any means such as a device or circuitry embodied in either hardware, or a combination of hardware and software that is configured to receive and/or transmit data from/to modules, entities, sensors and/or other components of aircraft 110 (or the ATG network 210) that are in communication with the processing circuitry 310.

The processor 312 may be embodied in a number of different ways. For example, the processor 312 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 312 may be configured to execute instructions stored in the memory 314 or otherwise accessible to the processor 312. As such, whether configured by hardware or by a combination of hardware and software, the processor 312 may represent an entity (e.g., physically embodied in circuitry—in the form of processing circuitry 310) capable of performing operations according to embodiments of the present invention while configured accordingly. Thus, for example, when the processor 312 is embodied as an ASIC, FPGA or the like, the processor 312 may be specifically configured hardware for conducting the operations described herein. Alternatively, as another example, when the processor 312 is embodied as an executor of software instructions, the instructions may specifically configure the processor 312 to perform the operations described herein.

In an example embodiment, the processor 312 (or the processing circuitry 310) may be embodied as, include or otherwise control the operation of the information manager 240 based on inputs received by the processing circuitry 310 responsive to receipt of dynamic aircraft information. As such, in some embodiments, the processor 312 (or the processing circuitry 310) may be said to cause each of the operations described in connection with the information manager 240 in relation to generation of the aviation cookie 305 responsive to execution of instructions or algorithms configuring the processor 312 (or processing circuitry 310) accordingly. In particular, the instructions may include instructions for processing 3D position information of the aircraft 110 along with any of a number of other types of aircraft information, as discussed below. The aviation cookie 305 may then be useable for providing content back to the aircraft 110 (or entities thereon) based on the dynamic aircraft information 360 as described herein.

In an exemplary embodiment, the memory 314 may include one or more non-transitory memory devices such as, for example, volatile and/or non-volatile memory that may be either fixed or removable. The memory 314 may be configured to store information, data, applications, instructions or the like for enabling the processing circuitry 310 to carry out various functions in accordance with exemplary embodiments of the present invention. For example, the memory 314 could be configured to buffer input data for processing by the processor 312. Additionally or alternatively, the memory 314 could be configured to store instructions for execution by the processor 312. As yet another alternative, the memory 314 may include one or more databases that may store a variety of data sets responsive to input sensors and components. Among the contents of the memory 314, applications and/or instructions may be stored for execution by the processor 312 in order to carry out the functionality associated with each respective application/instruction. In some cases, the applications may include instructions for providing inputs to control operation of the information manager 240 as described herein.

In some embodiments, the information manager 240 may provide the aircraft information as a replacement for, an attachment to, or an augmentation of an HTTP cookie or other web cookie. This replaced, modified or augmented cookie may be referred to as an aviation cookie and is one example of aircraft information provided by the information manager 240. The structure of a typical HTTP or web cookie includes a name, a value and (in some cases) one or more attributes. In an example embodiment, the aviation cookie may include name and/or value that is indicative of aircraft information. For example, the name of the aviation cookie may indicate that the cookie is an aviation cookie and the value may indicate aircraft location, destination or point of origination. Alternatively, the value may indicate information about the aircraft 110 that is sufficient to allow at least the destination or point of origination to be determined (e.g., from a lookup table of aircraft flight plans). In some cases, the value may provide identity information about the user or aircraft. Attribute information, if employed, may define an expiration time for the aviation cookie, which in some cases may indicate a time of arrival. However, other structures may alternatively be provided for the aviation cookie, and the aviation cookie may be coded, may be a hash of information that can be determined using a hash table as a reference, and/or may include a series of informational flags or data bins that are coded to allow a significant amount of information to be determined from a relatively small amount of transmitted data in the aviation cookie. In addition to the provision of location information and identity information, personal preferences or user-specific setting information may also be provided in the aviation cookie. In some cases, the aviation cookie may include a pointer to a table, website or other resource to enable the receiver of an aviation cookie to reference such resource in order to decipher the aviation cookie and serve content accordingly.

In such an example, the information manager 240 may be configured to intercept HTTP cookies, web cookies or other standard cookies and augment such cookies with the dynamic aircraft information 360. The augmentation may keep the cookies in a standard format, or may transform the cookies into a new format. In either case, the aviation cookie 305 represents a cookie that has been augmented, modified or otherwise replaces a standard cookie when employed in this context.

In examples in which the aviation cookie 305 creates a new format for the cookie, the format could take any useable form. The aviation cookie 305 may include at least some aircraft information that is usable for interaction with services provided via the Internet 230 and/or the content server 260. As an example, the aviation cookie 305 could support economy services by including information such as route and flight profile information to facilitate route optimization. In some cases, the aviation cookie 305 could include information capable of use with services related to compliance with certification standards or dispatch support. In some embodiments, maintenance information may be provided as part of the dynamic aircraft information 360 to enable the aviation cookie 305 to support maintenance scheduling and/or parts prepositioning by a service associated with the content server 260. As such, various on-board sensors may provide engine run hours, position information, temperature data, pressure data, RPM and/or various other aircraft operational metrics that may be reported as part of the aviation cookie 305 to facilitate en route and archival analysis of onboard systems and/or next generation flight essentials.

In some embodiments, the aviation cookie 305 may report information that may be used for safety related purposes. For example, the content server 260 may be associated with various services related to safety to allow the dynamic aircraft information 360 to be reported to the ground via the ATG network 210 for streaming black box services and/or exceedance events. Predictive and en route maintenance support, enhanced security, communications services and/or real time, high resolution weather services may also be supported by the provision of the aviation cookie 305 to the content server 260.

Accordingly, in some examples, the aviation cookie 305 may have a form or structure that includes at least a first portion (e.g., a header or body portion) that is indicative of identity (e.g., of the aircraft 110 or individual). The identity information may be used to determine preference settings (if related to an individual) or may be correlated to a maintenance record or maintenance service (if related to the aircraft 110). In some cases, the identity information may be used to lookup route planning information or scheduling information for the aircraft 110 (e.g., by processing circuitry of the content server 260). The aviation cookie 305 may also include a second portion indicative of a location of the aircraft 110 (and therefore also the individual). The second portion may identify GPS location including altitude, heading and speed, and/or may simply identify destination and point of origin, as described above. The aviation cookie 305 may also include a third portion including content or data indicative of or fulfilling a purpose of the aviation cookie 305. As such, the third portion may include an identity of the trigger event that caused generation of the aviation cookie 305, data related to aircraft health monitoring and/or exceedance events, or any other data that corresponds to the aviation cookies described herein.

In some cases, the aviation cookie 305 may also include a fourth portion used to indicate an intended recipient of the data. Thus, for example, if an exceedance event occurs, the first portion may identify the aircraft experiencing the exceedance event and the second portion may identify where the aircraft is located when the exceedance event occurred. The third portion may identify that the trigger of the aviation cookie 305 generation was the exceedance event, and may also provide some data about the exceedance event. The fourth portion may indicate the entity to be notified of the exceedance event and any data associated therewith. As such, for example, the content server 260 may receive the aviation cookie 305 and decode each coded portion described above to determine the content of the aviation cookie 305 (e.g., using hash tables, code tables, and/or the like). The content server 260 may then identify whether a manufacturer, maintenance facility, scheduler, owner, and/or other entity should be informed of the exceedance event and corresponding data associated therewith. The proper informing may then be executed (e.g., by messaging to other content servers and/or services).

By providing the fourth portion, aviation cookie routing (or at least routing of information received thereby) may be accomplished to ensure that follow-on activities can be scheduled, planned or otherwise executed. In some cases, the fourth portion may enable routing of data to a maintenance facility or manufacturer that will be able to identify patterns or events that have known or learnable corrective actions associated therewith. The data may otherwise be tracked to work toward such capabilities, in any case. As such, the content server 260 may route data to the proper party or parties to take and/or coordinate actions relative to the specific type of data or content provided in the aviation cookie 305.

In an example embodiment, various information provided in connection with the aviation cookie 305 may be used for operational and/or passenger productivity enhancement. For example, crew scheduling and training may be coordinated at least in part on the basis of information automatically polled from onboard systems or entered by crew manually as aircraft information that is reported to the content server 260 as the aviation cookie 305. Maintenance coordination, interface with ground services, disruption management, electronic flight bag (EFB) operations and schedule prediction may also be facilitated via the aviation cookie 305. Passenger productivity may be enhanced by providing support for office productivity applications, VPN extensions of corporate networks, enterprise security, real-time access to travel resources and internet research on the basis of aviation cookies 305. Thus, for example, internet research and/or travel resources could be tailored to current location, destination or point of origin. Ground transportation at the destination could, for example, be organized with respect to a specific time of arrival that is determinable based on point of origin and/or current location relative to the destination.

In some cases, entertainment resources may be tailored to information obtainable via the aviation cookie 305 as well. For example, emails, texts, video chats and/or the like may be augmented or enabled based on the aviation cookie 305. Streaming HD movies, music, games, online books, periodicals or newspapers may also be provided at least in part based on the aviation cookie 305. For example, the newspaper for the destination or the point of origin may be served to the UE 270 of a user requesting or searching for news based on the aviation cookie 305. Similarly, for any internet access or services or geography-specific digital rights management, the services requested may be provided based on the aviation cookie 305. As such, for example, content or responses to restaurant searches, or other services that are specific to a location can be tailored based on the aviation cookie 305. However, although the location information provided by the aviation cookie 305 may ensure that content served to the user is generated based on the location of the user at the time the request is made (e.g., when in the air and transiting to a given destination), the location information does not necessarily specifically dictate all aspects of the content served. Instead, for example, identity information of the user may also be included in the aviation cookie 305 and the identify information may, in some cases, counterbalance the provision of content strictly on the basis of the location of the request. For example, the aviation cookie 305 may include identity information that may identify the user's language preference, such that a request for an internet page is delivered in the language of the user, and not based on the location of the aircraft-serving ground based tower or access point in the case of satellite communications, balloon, drone, or other such relay node. Thus, for example, if the user is flying over and/or to a non-English speaking foreign country and attempts to requisition ground transportation while in-flight, the aviation cookie 305 may provide information indicative of the current location of the user, and the user's destination and estimated time of arrival. However, if the user speaks English, the aviation cookie 305 may still dictate that the content served, although served relative to a specific location, is served in English and not the native language of the location.

In some cases, the processing circuitry 310 may also be configured to receive the dynamic aircraft information 360 as an indication of a three dimensional position (e.g., GPS location including altitude), which may also be augmented with other sensor data. As such, for example, the quality of the ride being provided may be known in terms of the amount of turbulence encountered. The airline or other aviation services provider may therefore receive the aviation cookie 305 as an indicator of the location of the aircraft 110 and the current conditions on the trip. An apology or even discounts or coupons may be provided to encourage customer loyalty or at least let the customer know that the service provider is aware of the conditions of the flight, and is sensitive to trying to improve service and foster customer loyalty. In an example embodiment, the dynamic aircraft information 360 may include latitude and longitude coordinates and altitude to provide a position in 3D space. In some cases, the dynamic aircraft information 360 may further include heading and speed so that calculations can be made to determine, based on current location in 3D space, and the heading and speed (and perhaps also rate of change of altitude), a future location of the aircraft 110 at some future time or an estimated time of arrival at the destination. In some cases, flight plan information may also be used for predictive purposes to either prepare for maintenance or control actions that are likely to be needed, or to provide planning for asset management purposes.

The dynamic aircraft information 360 may be determined by any suitable method, or using any suitable devices. For example, the dynamic aircraft information 360 may be determined using global positioning system (GPS) information onboard the aircraft 110, using data from Automatic Dependent Surveillance-Broadcast (ADS-B) or other such systems, based on multilateration or triangulation of aircraft position based on a direction from which a plurality of signals arrive at the aircraft 110 from respective ones of the access points, using aircraft altimeter information, using radar information, and/or the like, either alone or in combination with each other. In some cases, the altitude, heading and reference system (AHRS) may provide information for use in generating the aviation cookie 305.

In an example embodiment, since the information manager 240 is capable of knowing aircraft location, and provides the aviation cookie 305 in association with specific requests or communications from communication equipment on the aircraft 110 (e.g., the UEs 270 or OCEs 272), the aviation cookie 305 can be indicative of the location and identity of specific communication equipment. As such, content specific to the individual and/or the location of the individual (now or in the future) can be used to tailor content or services to the individual. However, since the dynamic aircraft information 360 can also include any other data available from the aircraft 110, the aviation cookie 305 can provide much more than just information for servicing of the individual whose communications form the anchor of the aviation cookie 305. As such, in some cases, the aircraft information attaches to communications of an individual on the aircraft and facilitates the provision of services or information to the individual, but in other cases, the aircraft information facilities the provision of services or information that is unrelated to the individual (e.g., aircraft servicing, crew scheduling or training, route planning and/or the like). Thus, for example, the aviation cookie 305 may relate to aircraft health monitoring notification data bursts or other Internet of Things powered applications.

In some embodiments, the aviation cookie 305 can be attached or included with each request or communication provided from the UE 270 or OCE 272 on the aircraft 110. However, in other cases, the aviation cookie 305 may be attached to only specific communications or may be generated based on temporal constraints (e.g., at specific time intervals, when having traveled for a given time or when a specific time from landing). In other cases, the aviation cookie 305 may be generated based on specific event occurrences. Event-based generation of aviation cookies 305 may allow the current conditions experienced on the flight (e.g., maintenance issues, turbulence, and/or the like) to generate content based on the corresponding events that caused generation of the aviation cookie 305. Accordingly, for example, the aviation cookie 305 may not only provide an indication of the specific user and the user's location for the generation of content specific to the user's search or service requests based on location. Instead, the specific situation or events on the aircraft 110 can be provided into the aviation cookie 305 so that more targeted content or services can be provided. As an example, messages noting specific events may be generated, offers for upgrades, discounts and/or the like may be generated, scheduling activities or other context specific content may be generated by the content server 260 based on the aviation cookie 305. Flight delays, re-routing, maintenance milestones, weather developments and/or other events may therefore be accounted for and reacted to in real time while passengers and crew are still in the air, by virtue of the content server 260 being aware of the event that caused the aviation cookie 305 to be generated. The content server 260 can therefore provide targeted content or services based on the aviation cookie 305. As such, for example, the aviation cookie 305 may be indicative of a delayed arrival time for a particular passenger based on the current location, heading and speed, weather information en route to the destination, air traffic control information, and/or the like. The content server 260 may then provide prompting to the customer to rebook flight and/or hotel accommodations based on updated arrival time and/or location information. In some cases, the content server 260 may generate advertisements targeted to the passenger based on the dynamic aircraft information 360.

Regardless of whether the content server 260 responds to the aviation cookie 305 in real time, or whether some data is stored at the content server 260 for future planning/processing, the information manager 240 may be configured to provide the aviation cookie 305 for facilitating the provision of content or services at least in part based on the dynamic aircraft information 360. The content or services can therefore be provided in real time, or may be scheduled for future action. Accordingly, it should be appreciated that the information manager 240 may be generally configured to provide content and/or services based on dynamic aircraft information 360 that is used to generate the aviation cookie 305 for communications leaving the aircraft 110. The aviation cookie 305 may be added or otherwise generated before the communications leave the aircraft 110 (e.g., when the IM 240' is embodied on the aircraft 110), or after the communications leave the aircraft 110 (e.g., when the information manager 240 is an entity on the ground in communication with the ATG network 210).

Figure 4:
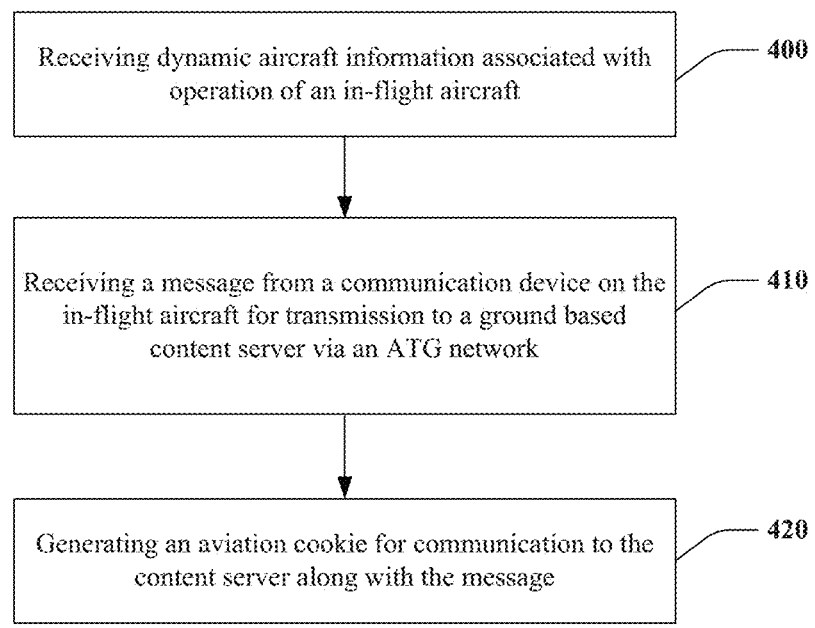
FIG. 4 illustrates a block diagram of a method for employing an aviation cookie in accordance with an example embodiment.

As such, the system of FIG. 2 may provide an environment in which the information manager 240 of FIG. 3 may provide a mechanism via which a number of useful methods may be practiced. FIG. 4 illustrates a block diagram of one method that may be associated with the system of FIG. 2 and the information manager 240 of FIG. 3. From a technical perspective, the information manager 240 described above may be used to support some or all of the operations described in FIG. 4. As such, the platform described in FIG. 2 may be used to facilitate the implementation of several computer program and/or network communication based interactions. As an example, FIG. 4 is a flowchart of a method and program product according to an example embodiment of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device (e.g., the information manager 240) and executed by a processor in the device. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method according to one embodiment of the invention, as shown in FIG. 4, may include receiving dynamic aircraft information associated with operation of an in-flight aircraft at operation 400, receiving a message from a communication device on the in-flight aircraft for transmission to a ground based content server via an ATG network at operation 410, and generating an aviation cookie for communication to the content server along with the message at operation 420. The aviation cookie may be generated based on the dynamic aircraft information and may enable the content server to generate content based at least in part on the dynamic aircraft information.

In some embodiments, the method may include additional, optional operations, and/or the operations described above may be modified or augmented. Some examples of modifications, optional operations and augmentations are described below. It should be appreciated that the modifications, optional operations and augmentations may each be added alone, or they may be added cumulatively in any desirable combination. In an example embodiment, the dynamic aircraft information may include position information of the aircraft, speed and heading of the aircraft, engine health monitoring data, real-time weather or environmental data and/or the like. In an example embodiment, the aviation cookie may be generated responsive to interception of an HTTP or web cookie and modification of the HTTP or web cookie. Alternatively or additionally, the aviation cookie may be generated responsive to an event occurrence on the aircraft. In such an example, the aviation cookie may include information indicative of the event. In some embodiments, the aviation cookie may be indicative of aircraft location and an identity of a communication device or user of the communication device. Alternatively or additionally, the aviation cookie may be generated based on a temporal constraint. In an example embodiment, the aviation cookie may be associated with the message from an individual, but may facilitate the provision of content or services related to the aircraft and unrelated to the individual. Alternatively or additionally, the aviation cookie may be associated with the message from an individual, and may facilitate the provision of content or services related to the individual. In such an example, the aviation cookie may further enable the provision of content or services based on a current or future location of the individual at a future time based on the dynamic aircraft information. In an example embodiment, the aviation cookie may be associated with a search request from the communication device, and a response from the content server may be generated based on a current location of the communication device, an arrival location for the aircraft, or a point of origin of the aircraft. In some cases, the aviation cookie may be indicative of flight progress or status, and a response from the content server may be generated based on the flight progress or status. In such an example, the response may include information for arranging transportation or accommodations at an expected time and location of arrival of the aircraft based on the dynamic aircraft information. Alternatively or additionally, the response may include information for arranging alternative flight arrangements based on the dynamic aircraft information. Alternatively or additionally, the response may include a coupon, an offer for upgrade, or a return message generated based on the dynamic aircraft information. Alternatively or additionally, the response may include an advertisement generated based on the dynamic aircraft information. Alternatively or additionally, the response may include information associated with services for operational productivity, passenger productivity, safety, entertainment, or economy.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. An information manager comprising processing circuitry configured to:
   intercept a message from a communication device on an in-flight aircraft being transmitted for processing at a ground based content server via a wireless communication network capable of communicating with in-flight assets; and
   modify, based on dynamic aircraft information received in association with the in-flight aircraft, the message to include an aviation cookie,
   wherein the aviation cookie includes a first portion indicative of identity information, a second portion indicative of current position information of the in-flight aircraft, a third portion including content or data associated with a function of the aviation cookie, and a fourth portion indicating an intended recipient of the content or data.

2. The information manager of claim 1, wherein the identity information identifies the in-flight aircraft.

3. The information manager of claim 2, wherein the function comprises reporting engine health monitoring data of the in-flight aircraft, and wherein the intended receipt comprises a maintenance facility.

4. The information manager of claim 3, wherein the function further comprises reporting the engine health monitoring data in response to occurrence of a trigger event associated with the in-flight aircraft, and wherein the third portion comprises information identifying the trigger event.

5. The information manager of claim 3, wherein the maintenance facility is enabled to schedule maintenance on the in-flight aircraft based on the dynamic aircraft information.

6. The information manager of claim 1, wherein the identity information identifies an individual on the in-flight aircraft.

7. The information manager of claim 6, wherein the function comprises requesting content from a content server on the ground, and wherein a response to requesting the content is provided based on a destination of the in-flight aircraft.

8. The information manager of claim 6, wherein the function comprises requesting content from a content server on the ground, and wherein a response to requesting the content is provided based on preference settings related to the individual.

9. The information manager of claim 1, wherein the dynamic aircraft information comprises speed and heading of the aircraft.

10. The information manager of claim 1, wherein the dynamic aircraft information comprises real-time weather or environmental data.

11. The information manager of claim 1, wherein the aviation cookie is generated based on a temporal constraint.

12. The information manager of claim 1, wherein the aviation cookie is associated with the message from an individual, but facilitates the provision of content or services related to the aircraft and unrelated to the individual.

13. The information manager of claim 1, wherein the aviation cookie is associated with the message from an individual, and facilitates the provision of content or services related to the individual.

14. The information manager of claim 13, wherein the aviation cookie further enables the provision of content or services based on a current or future location of the individual at a future time based on the dynamic aircraft information.

15. The information manager of claim 1, wherein the aviation cookie is associated with a search request from the communication device, and wherein a response from the content server is generated based on a current location of the communication device, an arrival location for the aircraft, or a point of origin of the aircraft.

16. A system comprising:
   a ground content server;
   an air-to-ground wireless communication network;
   an in-flight aircraft having communications equipment configured to communicate with the ground content server via the air-to-ground wireless communication network; and
   an information manager comprising processing circuitry configured to:
      intercept a message from a communication device on an in-flight aircraft being transmitted for processing at a ground based content server via a wireless communication network capable of communicating with in-flight assets; and
      modify, based on dynamic aircraft information received in association with the in-flight aircraft, the message to include an aviation cookie,
   wherein the aviation cookie includes a first portion indicative of identity information, a second portion indicative of current position information of the in-flight aircraft, a third portion including content or data associated with a function of the aviation cookie, and a fourth portion indicating an intended recipient of the content or data.

17. The system of claim 16, wherein the identity information identifies the in-flight aircraft,
wherein the function comprises reporting engine health monitoring data of the in-flight aircraft, and wherein the intended receipt comprises a maintenance facility, and
wherein the function further comprises reporting the engine health monitoring data in response to occurrence of a trigger event associated with the in-flight aircraft, and wherein the third portion comprises information identifying the trigger event.

18. The system of claim 17, wherein the content server is associated with the maintenance facility, and
wherein the content server is configured to schedule maintenance on the in-flight aircraft based on the dynamic aircraft information.

19. The system of claim 16, wherein the identity information identifies an individual on the in-flight aircraft.

20. The system of claim 19, wherein the function comprises requesting content from a content server on the ground, and wherein a response to requesting the content is provided based on a destination of the in-flight aircraft, and based on preference settings related to the individual.

* * * * *